US010598392B2

(12) United States Patent
Dennis

(10) Patent No.: US 10,598,392 B2
(45) Date of Patent: Mar. 24, 2020

(54) SOLAR ENERGY SYSTEM

(71) Applicant: ENDLESS SOLAR CORPORATION LTD, Melbourne, Victoria (AU)

(72) Inventor: Michael Dennis, Melbourne (AU)

(73) Assignee: Endless Solar Corporation LTD, Melbourne, Victoria (AU)

(*) Notice: Subject to any disclaimer, the term of this patent is extended or adjusted under 35 U.S.C. 154(b) by 926 days.

(21) Appl. No.: 14/407,436

(22) PCT Filed: Jun. 11, 2013

(86) PCT No.: PCT/AU2013/000619
§ 371 (c)(1),
(2) Date: Dec. 11, 2014

(87) PCT Pub. No.: WO2013/185171
PCT Pub. Date: Dec. 19, 2013

(65) Prior Publication Data
US 2015/0159914 A1     Jun. 11, 2015

(30) Foreign Application Priority Data

Jun. 12, 2012 (AU) ................................ 2012902456

(51) Int. Cl.
*F25B 27/00* (2006.01)
*F24D 17/00* (2006.01)
(Continued)

(52) U.S. Cl.
CPC ............ *F24D 17/0015* (2013.01); *F25B 7/00* (2013.01); *F25B 9/08* (2013.01); *F25B 27/002* (2013.01); *F25B 27/005* (2013.01)

(58) Field of Classification Search
CPC .. F25B 9/08; F25B 2400/0407; F25B 27/002; F25B 27/005; F25B 7/00
See application file for complete search history.

(56) References Cited

U.S. PATENT DOCUMENTS 4,007,776 A * 2/1977 Alkasab ............... F24F 5/0046
126/585
4,128,124 A 12/1978 Worthington
(Continued)

FOREIGN PATENT DOCUMENTS

AT     412 911 B     8/2005
CN     1807995 A     7/2006
(Continued)

OTHER PUBLICATIONS

International Search Report dated Aug. 20, 2013 in International Application No. PCT/AU2013/000620, filed Jun. 11, 2013.
(Continued)

*Primary Examiner* — David J Teitelbaum
(74) *Attorney, Agent, or Firm* — Knobbe Martens Olson & Bear, LLP

(57) ABSTRACT

The present disclosure provides a solar energy system. The solar energy system comprises a solar collector for providing energy generated from incident solar radiation. The system comprises a first heat exchange system comprising an ejector that is arranged to operate using at least a portion of the energy provided by the solar energy collector. Further, the system comprises a second heat exchange system arranged to operate using energy from an energy source other than a source of solar source. The solar energy system is arranged for direct or indirect transfer of thermal energy between the first heat exchange system and a region and between the second heat exchange system and the region. Further, the solar energy system is arranged for direct or indirect transfer of thermal energy from the second heat exchange system for use by at least one of: the first heat exchange system and a system for heating water.

17 Claims, 3 Drawing Sheets

(51) Int. Cl.
*F25B 7/00* (2006.01)
*F25B 9/08* (2006.01)

(56) References Cited

U.S. PATENT DOCUMENTS

| | | | |
|---|---|---|---|
| 4,173,994 | A | 11/1979 | Hiser |
| 4,374,467 | A | 2/1983 | Briley |
| 4,527,618 | A * | 7/1985 | Fyfe ............... F24D 11/0221 126/635 |
| 4,718,403 | A | 1/1988 | McCall |
| 5,761,923 | A * | 6/1998 | Maeda ............... F24F 3/1411 62/271 |
| 6,615,601 | B1 * | 9/2003 | Wiggs ............... F25B 13/00 62/235.1 |
| 2011/0048502 | A1 * | 3/2011 | Kikinis ............. F24D 11/0221 136/248 |
| 2011/0289953 | A1 | 12/2011 | Alston |

FOREIGN PATENT DOCUMENTS

| | | |
|---|---|---|
| CN | 101871440 | 10/2010 |
| EP | 1 962 024 A2 | 8/2008 |
| JP | 1976-063544 | 6/1976 |
| JP | 1977-019446 | 2/1977 |
| JP | 59-134432 | 8/1984 |
| JP | 59-145669 | 9/1984 |
| JP | 60-37777 | 3/1985 |
| JP | 2007-170690 | 7/2007 |
| JP | 2011-085331 | 4/2011 |
| JP | 2011-133123 | 7/2011 |

OTHER PUBLICATIONS

Huang, B.J. et al., "Collector selection for solar ejector cooling system," *Solar Energy* 71.4 (2001): 269-274.

International Search Report dated Sep. 2, 2013 in International Application No. PCT/AU2013/000619, filed Jun. 11, 2013.

Office Action received in Chinese Application No. 201380031207.9 dated Oct. 18, 2016.

* cited by examiner

SOLAR ENERGY SYSTEM

FIELD OF THE INVENTION

The present invention relates to a solar energy system.

BACKGROUND OF THE INVENTION

Solar energy can be used for heating and/or cooling of interior spaces in buildings. For example, photovoltaic solar panels may be used to convert sunlight into electrical energy that can be used to operate a compressor of a cooling system. However, solar energy is not available at a consistent level and a dual system that is operated using both a solar and a conventional energy source has been proposed.

However, it would be advantageous if the efficiency of such a dual system could be further improved.

SUMMARY OF THE INVENTION

In accordance with a first aspect of the present invention there is provided a solar energy system comprising:
  a solar collector for providing energy generated from incident solar radiation;
  a first heat exchange system comprising an ejector that is arranged to operate using at least a portion of the energy provided by the solar energy collector; and
  a second heat exchange system arranged to operate using energy from an energy source other than a source of solar source;
  wherein the solar energy system is arranged for direct or indirect transfer of thermal energy between the first heat exchange system and a region and between the second heat exchange system and the region; and
  wherein the solar energy system is arranged for direct or indirect transfer thermal energy from the second heat exchange system for use by at least one of: the first heat exchange system and a system for heating water.

For example, the energy source other than a source of solar energy may be a conventional energy source, such as a source of electrical energy. The second heat exchange system comprises in one specific example an electrical compressor.

The solar energy system may be arranged to transfer the thermal energy form the second heat exchange system to the first heat exchange system either directly or indirectly.

For example, the solar energy system may be arranged to transfer thermal energy directly from the second heat exchange system to a component of the first heat exchange system, such as solar circuit comprising the solar collector or the ejector.

Alternatively, the solar energy system may be arranged to transfer the thermal energy from the second heat exchange system to the first heat exchange system indirectly via an intermediate heat exchange system. For example, the solar energy system may comprise a first heat exchanger for transferring thermal energy from the intermediate heat exchange system to the first heat exchange system, and a second heat exchanger for transferring thermal from the second heat exchange system to the intermediate heat exchange system. The first heat exchanger may be a preheater and the second heat exchanger may be a desuperheater.

The solar energy system may also comprise a system for heating water that may also function as an energy storage system and/or a separate energy storage system. The solar energy system may be arranged such that, typically based on operation conditions of the solar energy system (such as heating and cooling conditions and/or based on external conditions such as an intensity of sunlight), at least a portion of the energy provided by the solar collector system is transferred directly or indirectly to the system for heating water and/or the energy storage system. Further, the solar energy system may be arranged such that a portion of the thermal energy that is transferred form the region by the second heat exchange system is transferred directly or indirectly to the system for heating water and/or the energy storage system. For example, the system for heating water and/or the energy storage system may form a part of the intermediate heat exchange system.

In one specific embodiment the second heat exchange system comprises an electrically powered compressor and the solar energy system is arranged such that excess thermal energy provided by the compressor is transferred directly or indirectly to the first heat exchange system and/or the system for heating water. In this specific embodiment the second heat exchange system typically is arranged to operate in a cooling mode.

The first heat exchange system may be arranged so as to be configurable between transferring thermal energy either directly or indirectly to the region (first mode) and transferring thermal energy either directly or indirectly from the region (second mode). In one example, the first heat exchange system comprises an ejector circuit and is arranged for bypassing at least a portion of the ejector circuit in the first mode of operation and is arranged such that the portion of the ejector circuit is not bypassed in the second mode of operation.

The second heat exchange system may also be arranged for selecting between a first mode for heating the region and a second mode for cooling the region. In one example, the second heat exchange system is a reverse cycle heat exchange system and may be a split system heat exchange system.

The solar energy system may comprise a control system that is arranged to control a cooling or heating contribution of the second heat exchange system dependent on a predetermined or preselected heating or cooling condition and/or dependent on a heating or cooling contribution of the first heat exchange system, which in turn may dependent on external parameters such as sunlight conditions.

Each of the first and second heat exchange systems may be arranged to transfer thermal energy indirectly to or from the region by exchanging heat with a hydronic circuit. The first and second heat exchange systems may comprise heat exchangers that are arranged to exchange heat with the hydronic circuit and the heat exchangers may be arranged to function as condensers when transferring thermal energy to the hydronic circuit, and to function as evaporators when transferring thermal energy from the hydronic circuit.

In accordance with a second aspect of the present invention there is provided a method of transferring thermal energy between a region and a solar energy system, the method comprising the steps of:
  providing a first heat exchange system arranged to receive energy generated form solar radiation, the first heat exchange system comprising an ejector and being arranged to transfer of thermal energy between the first heat exchange system and a region;
  providing a second heat exchange system that is operated by a source other than a source of solar energy;
  transferring thermal energy directly or indirectly from the region to the second heat exchange system and transferring at least a portion of that thermal energy directly or indirectly to at least one of: the first heat exchange system and a system for heating water.

For example, at least a portion of the thermal energy that is transferred to the first heat exchange system may be used for operation of the ejector.

BRIEF DESCRIPTION OF THE DRAWINGS

In order that the present invention may be more clearly ascertained, embodiments of the present invention will now be described, by way of example only, with reference to the accompanying drawings, in which.

DESCRIPTION OF AN EMBODIMENT OF THE INVENTION

Figure 1:
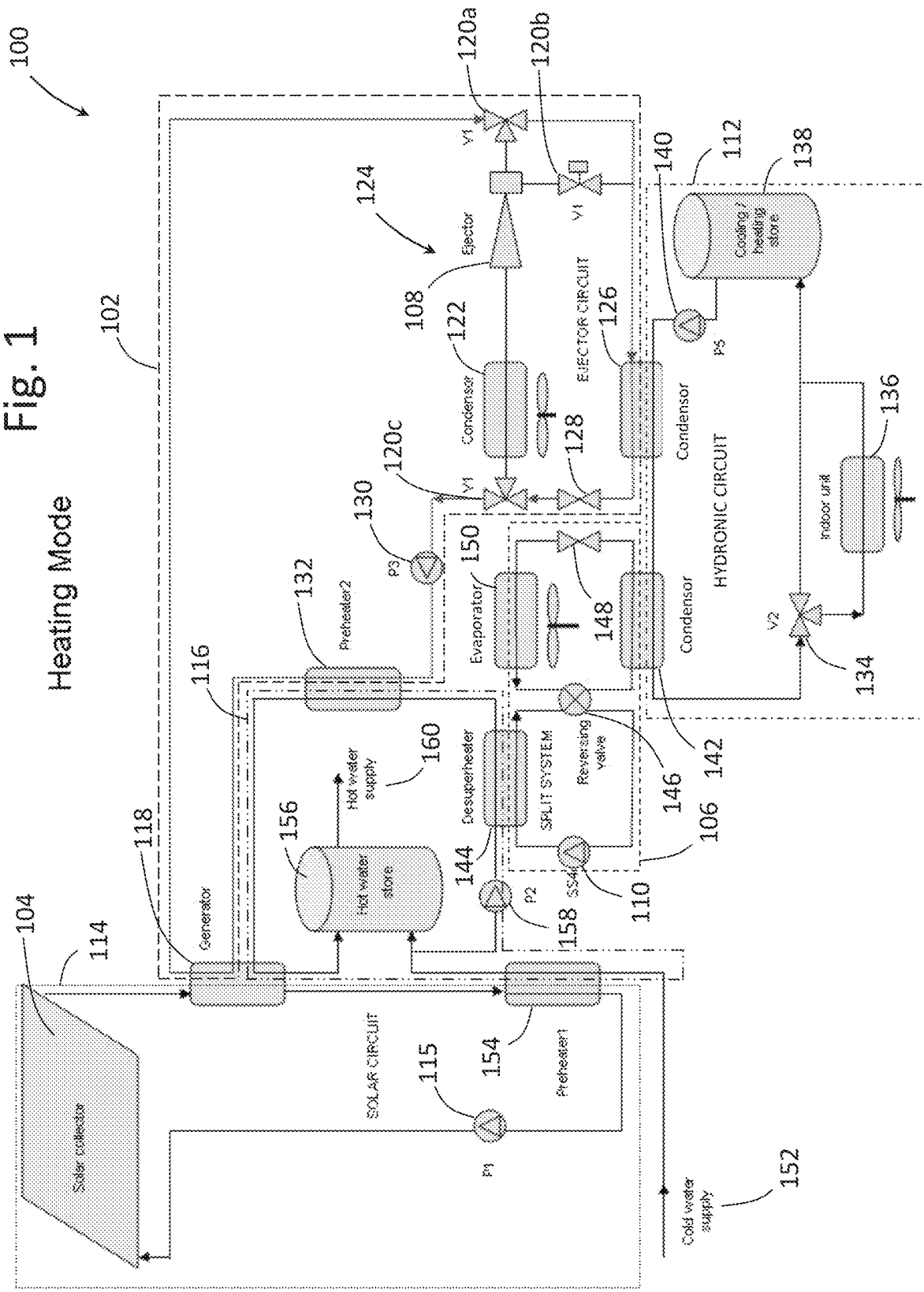
FIG. 1 is a schematic diagram of a solar energy system in accordance with an embodiment of the present invention, the solar energy system being arranged for operation in heating mode.

FIG. 1 shows an example of a solar energy system 100 for use in heating or cooling of a region. The system 100 can operate in heating mode, which is described in more detail with reference to FIG. 1, and in cooling mode, which is described in more detail with reference to FIG. 2.

Generally, the system 100 is arranged such that a first heat exchange system 102 of the system 100 is driven by heat energy obtained from a solar collector 104, and the first heat exchange system 102 is arranged to exchange heat in such a way so as to heat or cool the region.

The system 100 also comprises a second heat exchange system 106, which is powered by a conventional energy source such as mains electricity. The second heat exchange system 106 is employed to compensate for the first heat exchange system 102, for example at times when the first heat exchange system 102 does not receive sufficient thermal energy from the solar collector 104 to meet heating or cooling demands. The second heat exchange system 106 is therefore arranged to exchange thermal energy ("heat") in such a way so as to cool or heat the region in addition to the first heat exchange system 102.

The system 100 is also arranged to transfer heat from the second heat exchange system 106 for use by the first heat exchange system 102. For example, when the second heat exchange system 106 removes heat from a hydronic circuit 112 used to cool the region, the removed heat can be transferred for use by the first heat exchange system 102.

As mentioned previously, the first heat exchange system 102 is driven by heat obtained from the solar collector 104. Therefore, providing additional heat from the second heat exchange system 106 for use by the first heat exchange system 102 will improve an efficiency of the solar energy system 100.

The second heat exchange system 106 may also produce its own heat, for example by operation of an electrically powered compressor, and this heat can also be transferred from the second heat exchange system 106 for use by the first heat exchange system 102.

Heat can be transferred from the second heat exchange system 106 to a solar circuit 114 comprising the solar collector 104, such that a total amount of heat provided to the first heat exchange system 102 is greater than the heat that was provided by the solar collector 104 alone.

Alternatively, and in the examples described in more detail with reference to the Figures, the heat can be transferred from the second heat exchange system 106 to the first heat exchange system 102 via an intermediate heat exchange system such as a hot water system 116, the hot water system 116 also being arranged to receive at least some energy from the solar collector 104. It is envisaged that the heat could be transferred for use by the first heat exchange system 106 by other means, such as by transferring the heat directly to the first heat exchange system 102.

In one example, the second heat exchange system 106 is arranged to transfer the heat to the first heat exchange system 102 when the solar energy system 100 is operating in a cooling mode.

It will be appreciated that the heat transferred from the second heat exchange system 106 to the first heat exchange system 102 may be heat from the region and/or heat generated by the second heat exchange system during operation, for example waste heat produced by an electrically powered compressor that drives the second heat exchange system 106.

The solar energy system 100 may comprise a control system (not shown) that is arranged to vary an amount of heat that is transferred from the second heat exchange system 106 to the first heat exchange system 102. The control system is software controlled and is programmable, for example by a user, so as to increase the amount of heat transferred from the second heat exchange system 106 to the first heat exchange system 102 when the solar energy system is operating in cooling mode compared to when the solar energy system is operating in heating mode.

In the particular example illustrated in FIG. 1, the first heat exchange system 102 comprises an ejector 108. The ejector 108 functions as a compressor when supplied with heat energy from the solar collector 104. The ejector 108 therefore uses heat energy obtained from solar energy. This is in contrast to a conventional compressor, such as an electrically powered compressor 110 used in the second heat exchange system 106, wherein the compressor is driven by a conventional source of energy such as mains electricity.

Arranging the system 100 so as to maximise the amount of cooling or heating of the region by the first heat exchange system 102 provides the advantage of maximising an amount of renewable energy used in the cooling or heating of the region. In situations in which an insufficient amount of energy is provided for cooling or heating, the conventionally powered second heat exchange system 106 is used to supplement the cooling or heating.

Figure 2:
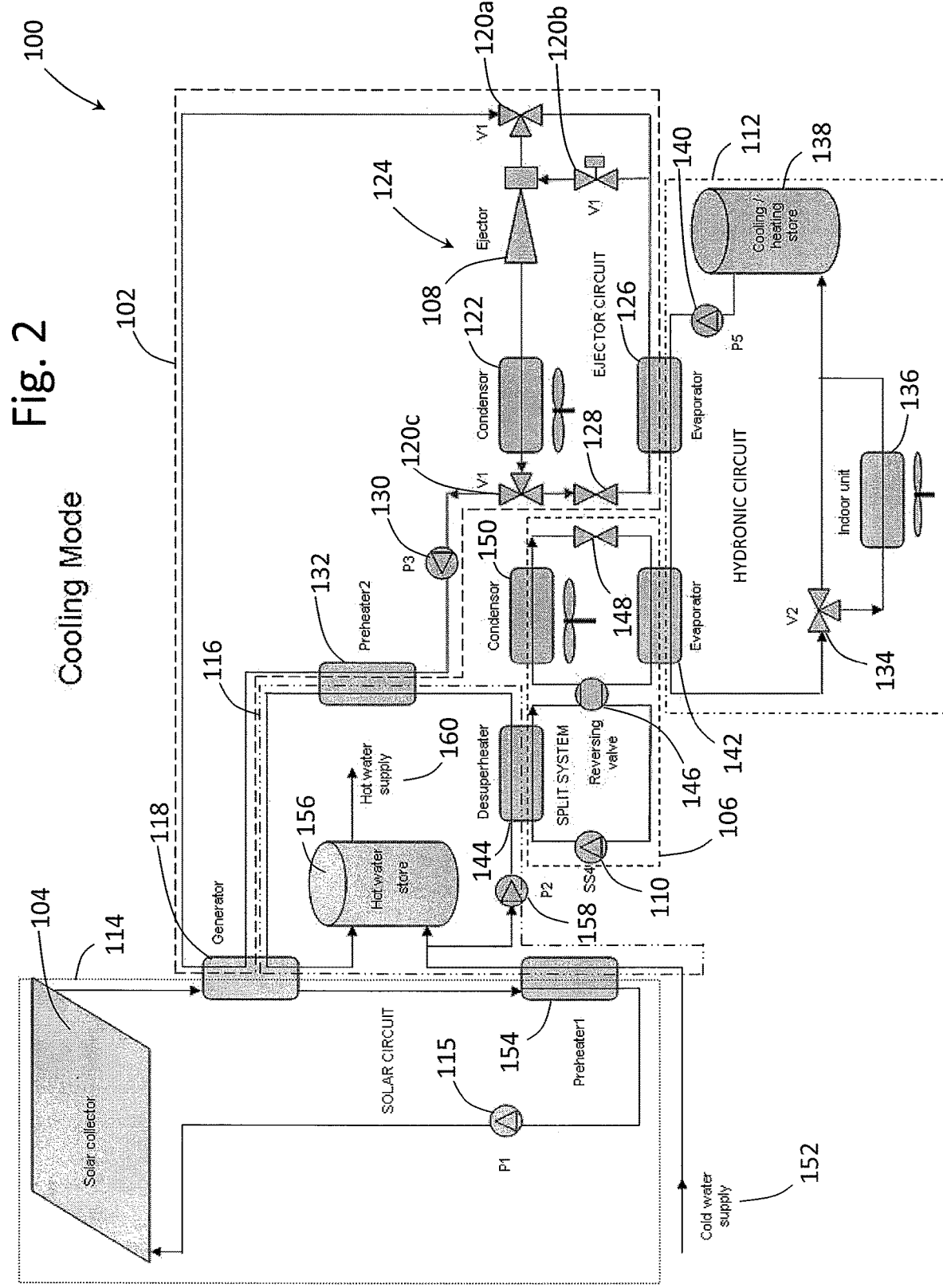
FIG. 2 is a schematic diagram of a solar energy system in accordance with an embodiment of the present invention, the solar energy system being arranged for operation in cooling mode.

The operation of the system 100 in heating mode will now be described in more detail with reference to FIGS. 1 and 2.

In addition to the first and second heat exchange systems 102, 106, the system 100 also comprises a hydronic circuit 112, which is arranged to exchange heat between each of the first and second heat exchange systems 102, 106 for use in supplying cooling or heating to the region. The system 100 also comprises a solar circuit 114 and a solar hot water system 116, the solar circuit 114 being arranged to supply heat energy obtained from the solar collector 104 to the first heat exchange system 102 and to the solar hot water system 116.

The system 100 is arranged to transfer heat energy via appropriate fluids. For example, the first and second heat exchange systems 102, 106 utilise refrigerants for heat transfer, and the hydronic circuit 112, solar circuit 114 and the solar hot water system 116 utilise water for heat transfer (and for supplying hot water in the case of the solar hot water system 116).

In heating mode, the solar circuit 114 will transfer heat energy from the solar collector 104 to the first heat exchange system 102 via a vapour generator (heat exchanger) 118. The water of the solar circuit 114 is pumped around the solar circuit 114 by a solar collector circulation pump 115, also marked as pump P1 in FIG. 1.

A bypass valve system V1, comprising valves 120a, 120b and 120c as shown in FIG. 1, is arranged (i.e., the bypass valve system V1 is enabled) such that heat energy supplied by the solar circuit 114 bypasses the ejector 108 and a condenser 122 of an ejector circuit 124. The heat energy flows through a heat exchanger 126 which, when the system 100 is operating in heating mode, functions as a condenser so as to transfer heat from the first heat exchange system 102 to the hydronic circuit 112.

Having supplied at least some heat energy to the hydronic circuit 112, the cooled refrigerant will flow through an open expansion valve 128 of the ejector circuit 124 and through the valve 120c to be pumped by ejector pressure pump 130, also marked as pump P3 in FIG. 1.

The refrigerant will then flow through a preheater 132 that is arranged to heat the refrigerant using heat from the hot water supply system 116 in certain circumstances, such as when heat produced by the second heat exchange system 106 is recovered by the hot water supply system 116 via a desuperheater when the second heat exchange system 106 is operating in a cooling mode (as explained in more detail later). The refrigerant then returns to the generator 118 where it is further heated by the solar circuit 114 and the cycle of the refrigerant transferring heat through the first heat exchange system 102 begins again.

As mentioned earlier, the first heat exchange system 102 transfers heat to the hydronic circuit 112 via the heat exchanger 126, functioning in this instance as a conventional liquid to liquid heat exchanger, that transfers heat from the first heat exchange system 102 to the hydronic circuit 112. The transferred heat will heat the water in the hydronic circuit 112, which then flows through a hydronic circuit heat exchanger bypass valve 134, also marked as valve V2 in FIG. 1, which is arranged (i.e., the bypass valve 134 is disabled) to direct the heated water to a heat exchanger 136 for use in providing heat to the region. In this example, the heat exchanger 136 is an indoor heat exchanging unit that is used to cool or heat the region.

The water, having provided at least some heat to the heat exchanger 136 for heating the region, then flows through a cooling/heating store 138 where additional heat can be stored, for example in a reservoir. Water flows from the cooling/heating store 138 to a hydronic circuit pump 140, also marked as pump P5 in FIG. 1, and the water is pumped through the heat exchanger 126 where heat is transferred from the first heat exchange system 102 to the hydronic circuit 112 and the cycle of transferring heat through the hydronic circuit 112 begins again.

If the system 100 is not supplying sufficient heat to the hydronic circuit 112 for use by the heat exchanger 136 to heat the region, then the system 100 is arranged to provide power to the second heat exchange system 106. In this example, the second heat exchange system 106 is a reverse cycle split system that can operate in a heating mode or in a cooling mode and comprises a heat exchanger 142 that is arranged to transfer heat between the second heat exchange system 106 and the hydronic circuit 112. In this example, the second heat exchange system 106 is operating in heating mode, and the heat exchanger 142 functions as a condenser so as to transfer heat from the second heat exchange system 106 to the hydronic circuit 112.

The compressor 110 of the second heat exchange system 106 is arranged to receive power from a source other than the solar collector 104. In this particular example, the compressor 110 is an electric compressor that is arranged to receive power from mains electricity. The compressor 110 compresses the refrigerant, which will be a vapour at this stage. The pressurised refrigerant then flows through a desuperheater 144 where excess heat can be transferred from the refrigerant to the hot water supply system 116, and then to the heat exchanger 142 via a reversing valve 146. Any heat that is transferred to the hot water supply system 116 via the desuperheater 144 can be transferred to the first heat exchange system 102 via the preheater 132. In this way, heat from the second heat exchange system 106 can be transferred to the first heat exchange system 102 for use in driving the ejector 108.

It will be appreciated that, although the desuperheater 144 can be used to transfer excess heat from the refrigerant to the hot water supply system 116, in heating mode it is preferable to direct heat from compressor desuperheating to the heat exchanger 142. Typically, excess heat is transferred to the hot water supply system 116 via the desuperheater 144 when the system is operating in cooling mode, which is described later with reference to FIG. 2.

The refrigerant condenses into a liquid in the heat exchanger 142, and heat is transferred from the heat exchanger 142 to the water flowing through the hydronic circuit 112 for use by the heat exchanger 136 to provide heat to the region.

The refrigerant, having transferred at least some heat to the hydronic circuit 112, then flows through an expansion valve 148 which lowers a pressure of the refrigerant. The refrigerant then flows through heat exchanger 150, functioning as an evaporator in this mode, which transfers heat to the refrigerant so as to vaporise and heat the refrigerant using heat from outside the region. The refrigerant then flows back to the compressor 110 for compression and the cycle of transferring heat to the hydronic circuit 112 begins again.

The system 100 is also arranged, if required (for example if heating demands are not met by the first heat exchange system 102), to transfer heat from the cooling/heating store 138 for use in the hydronic circuit so as to provide heat to the heat exchanger 136.

The system 100 is also arranged to provide solar hot water via the solar hot water system 116. The solar hot water system 116 receives water from a cold water supply 152. The water flows through a preheater 154 which is arranged to transfer heat from the solar circuit 114 to preheat the water. The water then delivers at least some heat to a hot water store 156, which in this example is a water tank arranged to store hot water. Water is then pumped by a hot water circulation pump 158, also marked as pump P2 in FIG. 1, through the desuperheater 144, where, if available, excess heat from the second heat exchange system 106 is transferred to the water. The water then flows through the preheater 132 where heat is transferred from the water to the refrigerant of the first heat exchange system 102 so as to preheat the refrigerant. The water then passes through the generator 118 where heat is transferred from the solar circuit 114 to the water. The heated water then flows to the hot water store 156 where the hot water is stored for use by a hot water supply 160.

Operation of the system 100 in cooling mode will now be described in more detail with reference to FIG. 2.

In cooling mode, the solar circuit 114 transfers heat energy from the solar collector 104 to the first heat exchange system 102 via the generator 118. The bypass valves 120a, 120b and 120c (bypass valve system V1) are arranged (i.e., the bypass valve system V1 is disabled) such that heat energy obtained from the solar circuit 114 is supplied to the ejector 108. The ejector 108, using the heat energy, functions as a compressor to pressurise the refrigerant (which will be a vapour at this stage). The refrigerant then flows to the condenser 122 where the refrigerant is cooled to a high pressure, moderate temperature liquid. The refrigerant is then directed by valve 120c to the expansion valve 128 where the pressure of the refrigerant is reduced. The refrigerant then flows through the heat exchanger 126, which functions as an evaporator so as to absorb heat from the hydronic circuit 112, effectively cooling the water in the hydronic circuit 112 and heating the refrigerant of the ejector circuit 124 to a heated vapour. The refrigerant then returns to the ejector 108 where the heated vapour is compressed and the cycle repeats.

In this way, the first heat exchange system is extracting heat from the hydronic circuit 112, therefore transferring coolth to the hydronic circuit 112 that can be used by the heat exchanger 136 to cool the region.

At least a portion of the refrigerant will be pumped by the ejector pressure pump 130 through the preheater 132 where it may absorb heat sourced from either the desuperheater 144 or hot water store 156 in hot water supply system 116, and then to the generator 118 where the refrigerant is heated by the solar circuit 114 again and the cycle of the refrigerant transferring heat through the first heat exchange system 102 begins again.

As mentioned earlier, the first heat exchange system 102 transfers thermal energy from the hydronic circuit 112 via the heat exchanger 126. The heat transfer will cool the water in the hydronic circuit 112, which then flows through the hydronic circuit heat exchanger bypass valve 134 (valve V2) which is arranged (i.e., the bypass valve 134 is disabled) to direct the cooled water to the heat to exchanger 136 for use in cooling the region.

The water, having cooled the indoor unit 136, then flows through a cooling/heating store 138 where additional "coolth" can be stored. Water flows from the cooling/heating store 138 to the hydronic circuit pump 140 and the water is pumped through the heat exchanger 126 where heat is transferred from the hydronic circuit 112 to the first heat exchange system 102 and the cycle of transferring the thermal energy via the hydronic circuit 112 begins again.

If the system 100 is not supplying sufficient coolth to the hydronic circuit 112 for use by the heat exchanger 136 to cool the region, the system 100 is arranged to provide power to the second heat exchange system 106 when operating in cooling mode wherein the heat exchanger 142 functions as an evaporator so as to transfer heat from the hydronic circuit 112 to the refrigerant of the second heat exchange system 106.

The compressor 110 of the second heat exchange system 106 receives power from mains electricity and compresses the refrigerant. The heated, compressed refrigerant then flows through a desuperheater 144 where excess heat may be transferred from the refrigerant to the hot water supply system 116, and then to the heat exchanger 150, functioning in this mode as a condenser, via the reversing valve 146. It will be appreciated that whether or not excess heat is transferred from the desuperheater 144 to the hot water supply system 116 depends on whether or not the hot water circulation pump 158 (pump P2) is switched on or off.

Any heat that is transferred to the hot water supply system 116 via the desuperheater 144 can be transferred to the first heat exchange system 102 via the preheater 132. In this way, heat from the second heat exchange system 106 can be transferred to the first heat exchange system 102 for use in driving the ejector 108.

As mentioned earlier in respect of the cooling mode described with reference to FIG. 1, it is preferable to transfer heat from the second heat exchange system 106 to the first heat exchange system 102 when the solar energy system 100 is operating in cooling mode. In this way, heat that is removed from the hydronic circuit 112 is not wasted, and is instead transferred to the first heat exchange system 102 for use in driving the ejector 108, thereby improving an efficiency of the solar energy system 100.

Returning to the cycle of the second heat exchange system 106, the refrigerant flows to the heat exchanger 150 where the refrigerant is condensed to a cooler liquid.

The refrigerant, having been cooled by the condensing action of the heat exchanger 150, then flows through the expansion valve 148, lowering the pressure of the refrigerant. The refrigerant then flows through the heat exchanger 142, functioning as an evaporator in this mode, which vaporises the refrigerant by transferring heat from the hydronic circuit 112 to the refrigerant. Vaporising the refrigerant cools the water of the hydronic circuit 112, and the heated, vaporised refrigerant flows back to the compressor 110 and the cycle of transferring thermal energy begins again.

The system 100 is also arranged, if required (for example if cooling demands are not met by the first heat exchange system 102), to transfer heat from the cooling/heating store 138 for use in the hydronic circuit 112 for use in cooling the region by the heat exchanger 136.

The system 100 is also arranged to provide solar hot water via the hot water system 116 when the system 100 is operating in cooling mode in the same manner as when the system 100 operates in heating mode.

Figure 3:
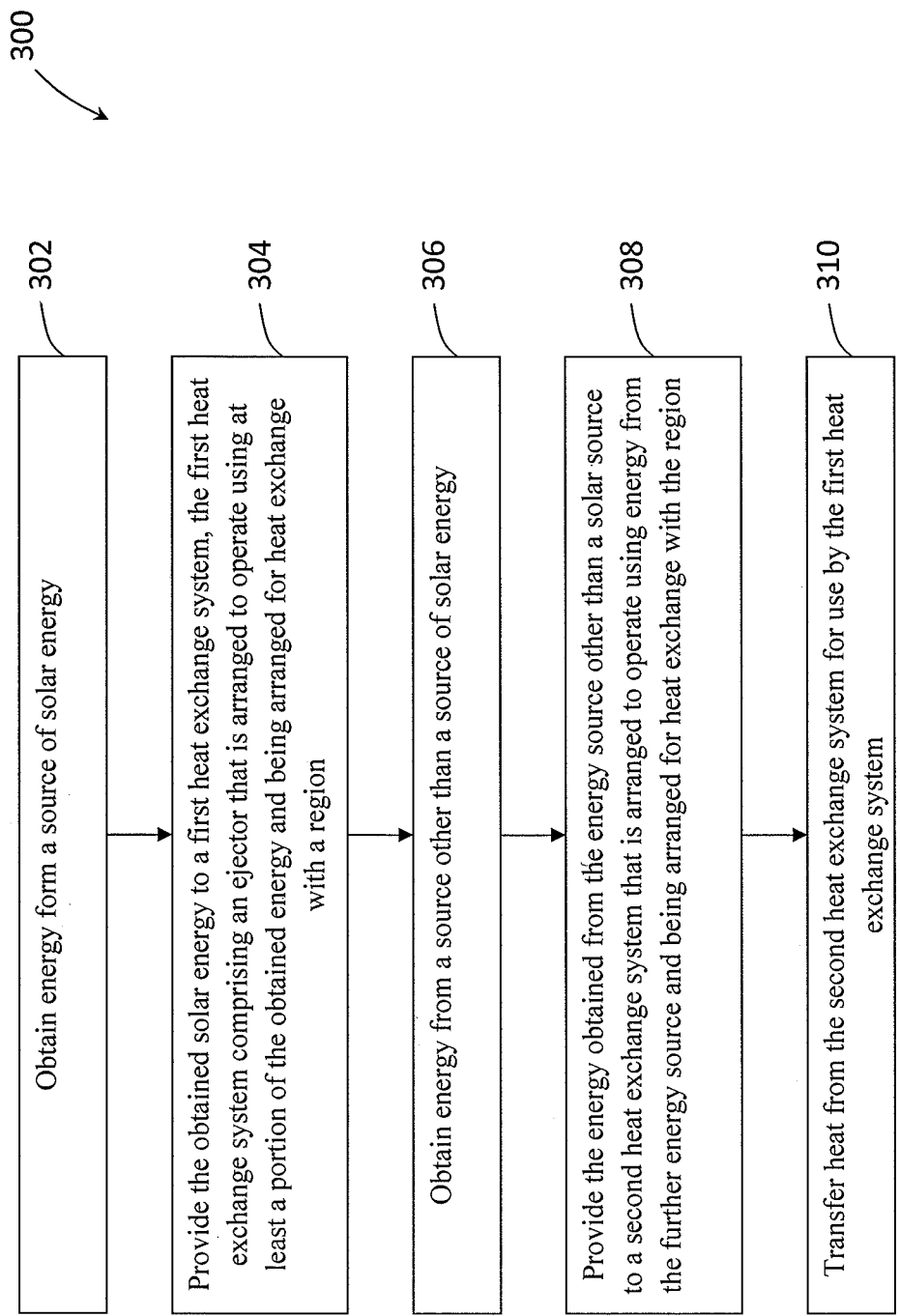
FIG. 3 is a flow chart illustrating a method of transferring thermal between a region and the solar energy system of FIG. 1 in accordance with an embodiment of the present invention.

FIG. 3 illustrates a method 300 of transferring heat between the region and a solar energy system 100.

The method 300 comprises a first step 302 of obtaining energy from a source of solar energy, for example via the solar collector 104. Step 304 provides the obtained energy is provided to the first heat exchange system 106. As described earlier, the first heat exchange system 106 comprises an ejector 108 that is arranged to operate using at least a portion of the obtained energy and is arranged for heat exchange with the region.

In step 306, energy is obtained from an energy source other than a source of solar energy, such as a conventional source of electrical electricity. Step 308 provides the energy obtained from the source other than the solar source to the second heat exchange system 106 which, as described earlier, is arranged to operate using energy from the further energy source and is also arranged for heat exchange with the region.

The method 300 also comprises a fifth step 310 of transferring heat from the second heat exchange system 106 for use by the first heat exchange system 102. As described earlier, it will be appreciated that the heat transferred from the second heat exchange system 106 to the first heat exchange system 102 may be heat obtained from the region, such as heat obtained when cooling the region, and/or heat generated by the second heat exchange system 106 during operation, for example heat generated by the compressor 110.

Further, it will be appreciated that the heat transferred from the second heat exchange system 106 may be transferred to the first heat exchange system 102 via the hot water system 116, although it is envisaged that the heat could be transferred for use by the first heat exchange system 106 by other means, such as by transferring the heat directly to the first heat exchange system 102, or by transferring the heat to the solar circuit 114 where the heat can contribute to solar energy obtained by the solar collector 104, and then transferred to the first heat exchange system 102 for use by the ejector 108.

Modifications and variations as would be apparent to a skilled addressee are determined to be within the scope of the present invention.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A solar energy system comprising:
a solar collector for providing energy generated from incident solar radiation;
a first heat exchange system comprising an ejector that is arranged to operate using at least a portion of the energy provided by the solar energy collector; and
a second heat exchange system arranged to operate using energy from an energy source other than a source of solar energy,
wherein the solar energy system is arranged for direct or indirect transfer of thermal energy between the first heat exchange system and a region and between the second heat exchange system and the region, wherein the first heat exchange system and the second heat exchange system are capable of simultaneously transferring thermal energy between the respective first or second heat exchange system and the region,
wherein the solar energy system is arranged for direct or indirect transfer of thermal energy from the second heat exchange system for use by at least one of: the first heat exchange system and a system for heating water,
wherein the first and second heat exchange systems are arranged to transfer thermal energy indirectly to or from the region by exchanging heat with a hydronic circuit, and
wherein the first and second heat exchange systems comprise heat exchangers that are arranged to exchange heat with the hydronic circuit and wherein the heat exchangers are arranged to function as condensers when transferring thermal energy to the hydronic circuit, and to function as evaporators when transferring thermal energy from the hydronic circuit.

2. The solar energy system of claim 1 wherein the energy source other than the source of solar energy is a source of electrical energy and wherein the second heat exchange system comprises an electrical compressor.

3. The solar energy system of claim 1 wherein the solar energy system is arranged to transfer thermal energy directly from the second heat exchange system to a component of the first heat exchange system.

4. The solar energy system of claim 1 wherein the solar energy system is arranged to transfer the thermal energy from the second heat exchange system to the first heat exchange system indirectly via an intermediate heat exchange system.

5. The solar energy system of claim 4 comprising a first heat exchanger for transferring thermal energy from the intermediate heat exchange system to the first heat exchange system, and a second heat exchanger for transferring thermal energy from the second heat exchange system to the intermediate heat exchange system.

6. The solar energy system of claim 5 wherein the first heat exchanger is a preheater.

7. The solar energy system of claim 5 wherein the second heat exchanger is a desuperheater.

8. The solar energy system of claim 1 comprising the system for heating water.

9. The solar energy system of claim 8 wherein the solar energy system is arranged such that a portion of the energy provided by the solar collector system is transferred directly or indirectly to the system for heating water.

10. The solar energy system of claim 8 wherein the solar energy system is arranged such that a portion of the thermal energy that is transferred from the region by the second heat exchange system is transferred directly or indirectly to the system for heating water.

11. The solar energy system of claim 10 wherein the system for heating water forms a part of an intermediate heat exchange system.

12. The solar energy system of claim 8 wherein the second heat exchange system comprises an electrically powered compressor and the solar energy system is arranged such that excess thermal energy provided by the compressor is transferred directly or indirectly to the system for heating water.

13. The solar energy system of claim 1 wherein the second heat exchange system comprises an electrically powered compressor and the solar energy system is arranged such that excess thermal energy provided by the compressor is transferred directly or indirectly to the first heat exchange system.

14. The solar energy system of claim 1 wherein the first heat exchange system is arranged so as to be configurable between transferring thermal energy either directly or indirectly to the region (first mode) and transferring thermal energy either directly or indirectly from the region (second mode).

15. The solar energy system of claim 14 wherein the first heat exchange system comprises an ejector circuit and is arranged for bypassing at least a portion of the ejector circuit in the first mode of operation and is arranged such that the portion of the ejector circuit is not bypassed in the second mode of operation.

16. The solar energy system of claim 1 wherein the second heat exchange system is arranged for selecting between a first mode for heating the region and a second mode for cooling the region.

17. The solar energy system of claim 1 comprising a control system that is arranged to control a cooling or heating contribution of the second heat exchange system dependent on a predetermined or preselected heating or cooling condition.

* * * * *